Dec. 16, 1952     E. S. KILLIAN     2,622,129
METHOD AND APPARATUS FOR TESTING PROPHYLACTIC ARTICLES
Filed Aug. 4, 1949     2 SHEETS—SHEET 1
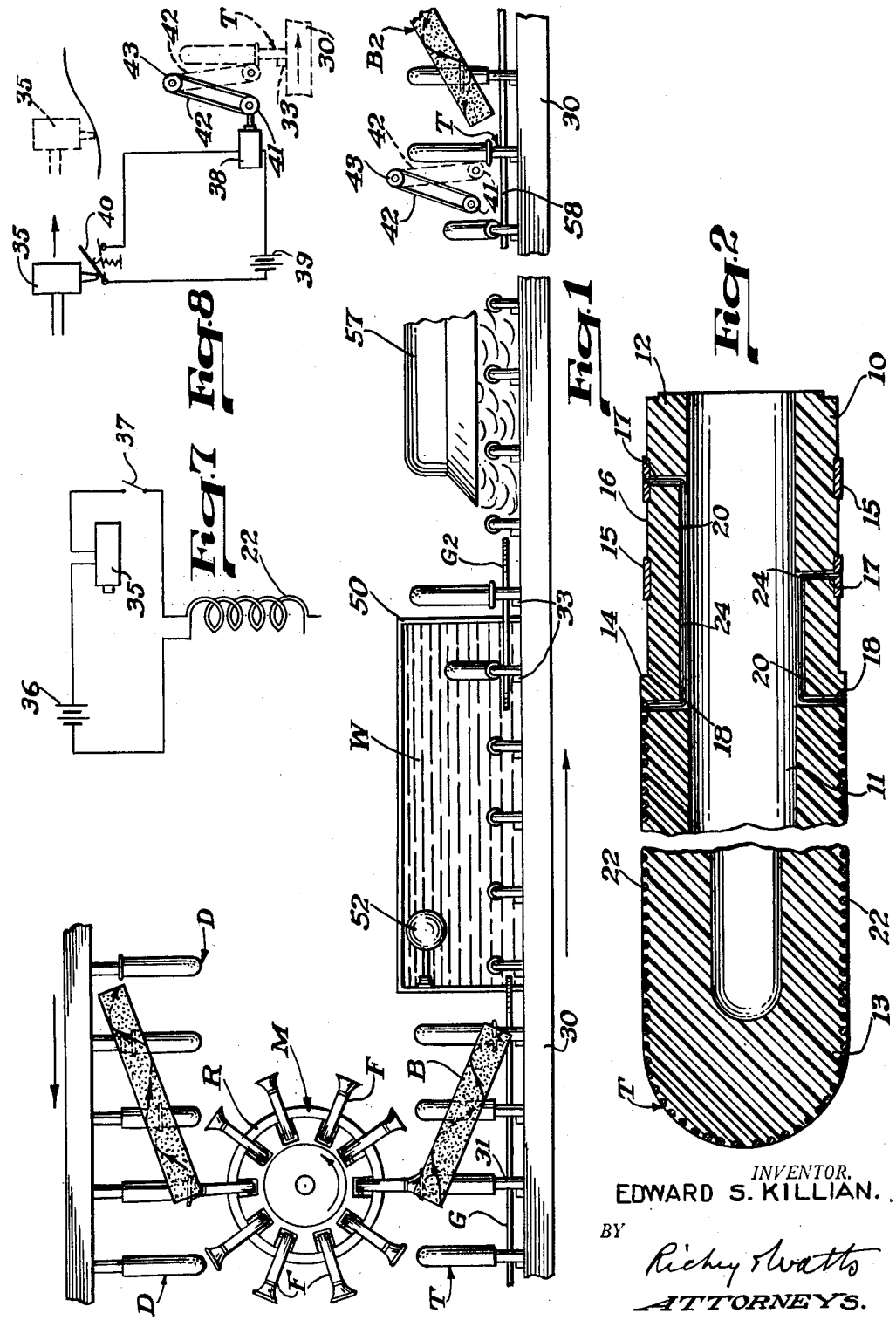
INVENTOR.
EDWARD S. KILLIAN.
BY
Richey & Watts
ATTORNEYS.

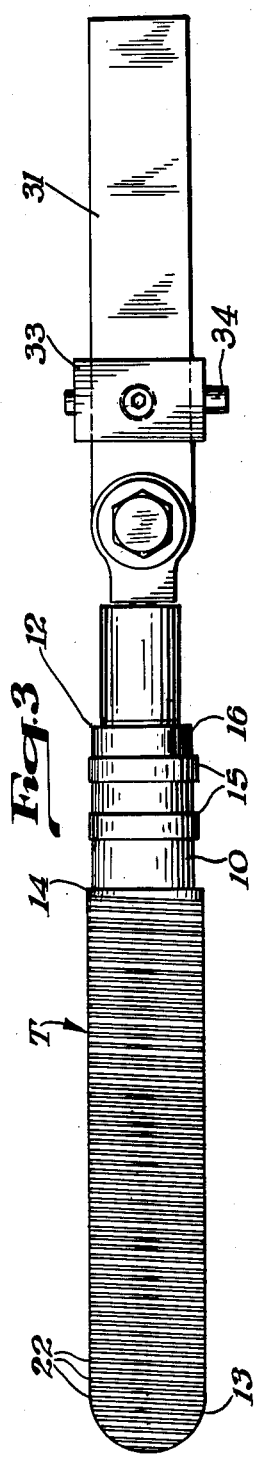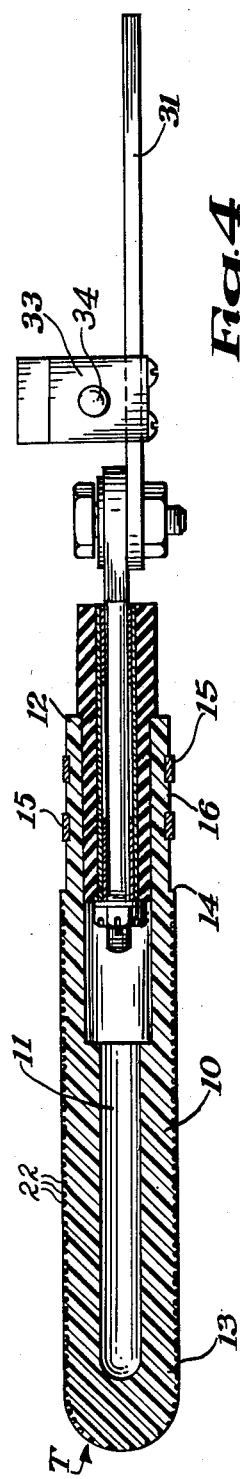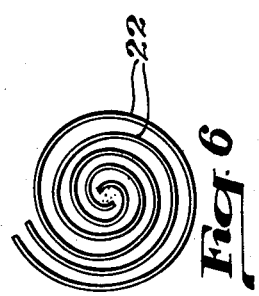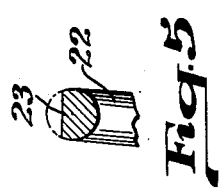

Patented Dec. 16, 1952

2,622,129

UNITED STATES PATENT OFFICE 2,622,129

METHOD AND APPARATUS FOR TESTING PROPHYLACTIC ARTICLES

Edward S. Killian, Akron, Ohio, assignor to Frank B. Killian & Company, Akron, Ohio, a partnership Application August 4, 1949, Serial No. 108,527

16 Claims. (Cl. 175—183)

The present invention relates generally to the art of permeability testing and is more particularly concerned with a novel method for detecting holes in thin walled, hollow, tubular rubber articles, such as prophylactics, and with novel apparatus implementing this method and automatically separating perforate from imperforate articles.

In the manufacture of rubber prophylactic articles by conventional methods, such as that described and claimed in U. S. Patent 2,128,280, issued August 30, 1938, defective articles i. e., those having holes, are produced in small percentages. Since a perforate article of this kind is worse than useless, it is necessary to examine each article with the utmost care to insure that only sound and perfect goods are marketed. Heretofore, automatic electrical inspection means of two different types have been employed commercially for such testing.

According to one automatic prior art procedure, one of these articles is placed on a form which serves as an electrode and a second electrode is disposed around the article and an electric current of sufficiently high potential is imposed on one of the electrodes to produce a spark discharge to the other electrode, whenever a hole is present in the article between the electrodes. In an effort to insure detection of all the holes, the current used was large enough to make holes where thin spots existed in the walls. This high current produced defective articles in this manner and did not detect all holes. Besides the apparatus required delicate adjustment and often unexpectedly failed to work properly.

According to the other automatic method and means referred to above, an article to be tested is disposed on a suitable form of electrically conductive material connected to a source of direct current and is immersed in an electrically conductive liquid in an electrically grounded vessel. In other words, the article and electrodes form a temporary condenser, and a charge impressed on the condenser will leak off where there are holes in the goods. The apparatus required for use in this method includes electronic circuits and vacuum tubes and requires attention to insure its remaining in proper state of adjustment.

In accordance with my present invention, I employ a simple device made of a few simple parts which does not depend on sensitive adjustments and is not susceptible to easy loss of adjustment. By means of this invention, it is possible consistently to detect in such articles holes which are as small as can be detected by the above described devices.

The method of this invention comprises generally the steps of slightly stretching the article, inserting into the article a pair of closely spaced, independent electrodes constituting part of an open electric circuit including an electric power source, contacting the outside surface of the thus expanded article with an electrically conductive liquid, and utilizing any of said liquid which passes through a hole in the article to connect the electrodes and close said circuit.

In more detail, as I have actually successfully carried out the present method, the first step comprises inserting the rounded closed end of a form generally resembling a dipping form into one of these articles, and thereby slightly stretching the article, this form being of some suitable dielectric material and carrying in its surface two closely spaced, exposed, independent electrodes which make up a substantial portion of the exposed or outer surface of said form, and are connectable to an electric current source in an open circuit.

As the next step, the thus expanded article is contacted with the electrically conductive liquid as by immersing the article in a bath of the liquid. Preferably, the article is then treated to remove selectively from its outer surface, as by heating and evaporating, substantially all of said liquid adhering thereto. Electrical connection of the electrodes to the power source is then made, and the circuit including the power source and the electrodes is closed by liquid within the article.

Connection of the electrodes to the power source may be made prior to, during, or after the liquid-contacting step and the step of selectively removing adhering liquid from the outside surface of the article may be omitted. In any event, however, the electrodes should be electrically charged after said contact step in order to determine whether any liquid has penetrated the article during this contact step.

The submerging operation is carried out suitably with a water bath, the article being dipped into the bath, which preferably contains some suitable wetting or surface-active agent to increase the penetrating power of the water. The article is then removed from the bath and its outer surface portion is subjected to a temperature from about 110° F. to 130° F. for about three minutes whereby substantially all the water adhering thereto is selectively removed from the article. Thereupon the connection of the electrodes in a circuit with a source of electric current is established. If the electrodes are contacted by water which has entered the article during the submerging operation, the same circuit is closed and a signalling device is actuated, or preferably apparatus is set into motion which will result in the automatic scrapping of the defective article.

The apparatus implementing this method is preferably fully automatic and is entirely dependable, simple and easy to install, operate and maintain, as will be better understood by those skilled in the art on consideration of the following detailed description of this apparatus, as illustrated in the drawings accompanying and forming a part of this specification, in which:

Figure 1 is a diagrammatic, fragmentary, plan view, partly in section, of apparatus embodying this invention in a preferred form for manufacturing and testing rubber prophylactic;

Figure 2 is an enlarged, transverse, sectional view of a testing form of this invention and the Fig. 1 apparatus;

Figure 3 is a full view of the form of Fig. 2 and carrying means therefor;

Figure 4 is a longitudinal, sectional view of the Fig. 3 assembly showing the carrying means at right angles to its Fig. 3 position;

Figure 5 is a fragmentary cross-sectional view of an electrode turn such as is embedded in the surface of the form of the foregoing figures;

Figure 6 is a fragmentary end view of the spiralled electrodes of said form;

Figure 7 is a wiring diagram of an electric circuit including said electrodes for detecting defective articles; and Figure 8 is a wiring diagram of another electric circuit to operate apparatus for removing defective articles from their forms.

Generally, the present apparatus comprises an elongated generally cylindrical body, a pair of electrodes defining a double spiral and being spaced apart from each other throughout the entire lengths. In use on a commercial scale, this apparatus will preferably also include suitable conveyor means for carrying a plurality of such forms around a closed course along which are located stations where articles carried on the forms may be tested, the defective articles may be automatically removed and scrapped, and the perfect articles may be separately removed from the forms and packaged, as generally disclosed and claimed in U. S. Patent #2,128,827, issued October 30, 1938. Apparatus of this type, including various stations and guide means are illustrated schematically in Fig. 1 wherein is shown transfer means M for taking articles from dipping forms D on one conveyor line and putting them on testing forms T of another conveyor line moving in the opposite direction but parallel to the first line.

More particularly, the basic element of this invention, that is testing form T, as shown in Figs. 2, 3, and 4, is made up of a generally cylindrical body 10 of dielectric material having a deep, axially extending recess 11 opening through the normally supported end 12 of the form, the immersion end 13 of the form being closed and rounded. Adjacent to end 12, body 10 has an annular shoulder 14, said end 12 being of slightly reduced outside diameter compared to the adjacent intermediate portion of the form. Two spaced current collector rings 15 are partially imbedded in the reduced portion or shank 16 of the form for engagement with electrical brushes (not shown) disposed along a portion of the course of travel of the conveyor. Two small radial bores 17 are provided in shank 16, opening through the outer surface of the shank under rings 15 for purpose subsequently to be described. Two more small radial bores 18 are provided in the intermediate portion of the body adjacent to shoulder 14, and two diametrically opposed grooves 20 are formed in the inner wall of the shank and adjacent intermediate portion to connect these two sets of bores in separate pairs. Two spaced, relatively shallow tight spiral grooves are provided in the outer surface of the body, communicating at one end with one or the other of the bores 18 and extending over the intermediate portion and end 13 of the body, where they are terminate. A wire 22 of copper, aluminum or other suitable electrically conductive material, is disposed in and substantially fills the said spiral grooves, extending from end to end thereof and having exposed substantially flat surface portions 23 flush with the adjacent surface portions of body 10 at each and every point throughout their lengths, so that the form presents a very smooth even surface over its intermediate portions and end 13. Preferably, the wire should constitute between about 20% and about 40% of the surface area of the form normally engaged with goods being tested according to this invention. Lead wires 24 disposed in bores 17 and 18 and in grooves 20 connect wires 22 electrically to one or the other of the rings 15.

The cross-sectional appearance of a typical portion of wire 22 is illustrated in Fig. 5, and the arrangement and relationship of two tightly spiralled wires 22 at the immersion end of the testing form is shown in Fig. 6, body 10 being omitted in the interest of clarity.

Body 10 is formed or cut to the shape desired above and the wires 22 are assembled therewith in any convenient manner, a suitable adhesive material being provided as a coating on the wires or as a deposit in the wire grooves before the assembling operation. Alternatively, where the material of the form itself has adhesive properties with respect to the wire, as for example, when material is heat-softenable, the assembling operation may be carried out with suitable portions of the body heated. In any event, care should be exercised in this assembling operation to assure that the exposed wire surfaces 23 are substantially flush with the adjacent surfaces of the body so that no substantial prominence or groove is apparent in the surface of the form, as such imperfections may lead to undesirable liquid flow along the surface of the form or cause damage to the goods applied to the forms. To facilitate the production of forms perfect in this respect, I prefer to apply a dressing coat of the same material as body 10 to the form after the wire has been assembled therewith. The wire may then be uncovered by removing this coat therefrom, as by an abrasion operation.

Forms T are in each instance attached rotatably to a conveyor belt 30 by means of an arm 31 carrying a block 33 having a plunger pin 34 which projects from the block and is retained therewith for limited motion relative thereto by means of a spring detent (not shown) in the said block, the pin having two spaced radial grooves to receive said detent in the usual way. A solenoid 35 is electrically connected to wires 22 and a battery 36 in the open circuit illustrated in Fig. 7 and including a switch 37. In another open circuit, shown in Fig. 8, another solenoid 38 is provided and power is furnished to operate it by a battery 39 when a spring switch 40 is closed. A movable pulley 41 is associated with the core of solenoid 38 for lateral movement relative to form T to bring a rubber V-belt 42, running on pulley 41 and stationary pulley 43, into engagement with defective goods on form T thereby to strip the goods from the form and scrap them. Belt 42 is driven constantly and at a fairly high speed to accomplish this result, by means of an electric motor or the like (not shown). Thus, when the circuit of wires 22 has been closed by operation of switch 37 and by liquid which has passed through a hole in a defective article carried on form T, solenoid 35 is actuated and the core thereof strikes and displaces plunger pin 34. Pin 34 is carried along its course by the conveyor and shortly engages and closes switch 40 and pulley 41 in the circuit of said switch 40 is caused automatically to move relative to the form associated with pin 34 so that belt 42 comes into contact with the defective article on said form. If the goods on any of the forms carried by the conveyor are perfect, the circuit of solenoid 35 is not closed, even though switch 37 may be closed, and pin 34 is not disposed to an abnormal position and these goods are not stripped by belt 42.

In its travel, as indicated above, conveyor belt 30 brings the forms T in succession along a course passing transfer means M where fingers F of circular rotatable transfer table R come into engagement with the rounded end portions of forms T and a rotating elongated brush B effects the transfer of goods from fingers F to the forms and unrolls the goods onto the forms as indicated in Fig. 1. The forms then are permitted to fall from a horizontal position in which they are maintained by a guide rail to substantially a vertical position and into a bath of electrically conducted liquid, such as water W, in which a wetting agent has been incorporated to enhance the penetrability of the water through holes in the goods on the forms. The level of water W in an elongated open-top vessel 50 disposed below belt 30 may be maintained in any suitable manner as by means of a conventional automatic float control valve 52. By means of another guide rail G-2, the forms are lifted from vessel 50, carried beyond said vessel and dropped again into substantially vertical position for passage through a drying zone, the equipment of which is diagrammatically indicated at 57. Still another guide 58 then brings the form back into substantially horizontal position at a point adjacent to the extended position of pulley 41 for removal of defective goods as described above. Further movement of the form along its course brings the form into engagement with a second brush B-2 revolving in a direction opposite to that of the first brush to roll up the goods on the form and effect transfer by mechanism such as means M as described above.

Having thus described the present invention so that others skilled in the art will be able to understand and practice the same, I state that what I desire to secure by Letters Patent is defined in what is claimed.

What is claimed is:

1. A form for use in testing the fluid porosity of an elastic dielectric article comprising an elongated generally cylindrical body having a rounded end portion for immersion in a testing fluid, and a pair of elongated electrodes embedded in the body with their exposed portions lying substantially flush with the surface of said body, said electrodes being spaced apart from each other throughout their lengths and defining a double spiral extending over side portions and the rounded end portions of said body.

2. A form for use in testing the fluid porosity of an elastic dielectric article comprising an elongated generally cylindrical body having a closed rounded end having a rounded end portion for immersion in a testing fluid, and a pair of electrodes embedded in the body with their exposed portions lying substantially flush with the surface of said body and comprising between about 20% and about 40% of the surface of said body to contact said article, said electrodes being spaced apart from each other throughout their lengths and defining a double spiral extending over side portions and the rounded end portion of said body.

3. A form for use in testing the fluid porosity of an elastic dielectric article comprising an elongated generally cylindrical body having a closed rounded end to engage said article and a shank portion, a pair of electrodes embedded in the body with their exposed portions lying substantially flush with the surface of said body and comprising between about 20% and about 40% of the surface of said body excluding the shank, and a pair of spaced current collector rings carried by the said shank and separately electrically connected to the said electrodes, said electrodes being spaced apart from each other throughout their lengths and defining a uniformly spaced spiral extending over side portions and the rounded end portion of said body.

4. A form for use in testing the fluid porosity of an elastic dielectric article comprising an elongated generally cylindrical body having a closed rounded end to engage said article and a shank of reduced diameter, a pair of electrodes embedded in the body with their exposed portions lying substantially flush with the surface of said body and comprising between about 20% and about 40% of the surface of said body excluding the shank, and a pair of spaced apart current collector rings carried by the shank and electrically connected to the electrodes, said body being provided with passageways leading from each said ring through the shank and emerging adjacent to each other in an enlarged diameter portion of the body, said electrodes extending through said passageways and being spaced apart from each other throughout their length and describing a double spiral beginning adjacent to said shank and ending substantially at the top of said rounded end.

5. The method for testing a rubber prophylactic article for holes which comprises the steps of slightly stretching the article, inserting into the article a pair of closely spaced, independent electrodes constituting part of an open electric circuit including an electric power source, contacting the outside surface of the thus expanded article with an electrically conductive liquid, and utilizing any of said liquid which passes through a hole in the article to connect the electrodes and close said circuit.

6. The method for testing rubber propylactic articles for holes which comprises the steps of slightly stretching the article, inserting into the article a pair of closely spaced, independent electrodes constituting part of an open electric circuit including an electric power source, contacting the outside surface of the thus expanded article with an electrically conductive liquid, connecting said electrodes to the power source, and utilizing any of said liquid which passes through a hole in the article to connect the electrodes and close said circuit.

7. The method for testing a rubber prophylactic article for holes which comprises the steps of slightly stretching the article, inserting into the article a pair of closely spaced, independent electrodes constituting part of an open electric circuit including an electric power source, contacting the outside surface of the thus expanded article with an electrically conductive liquid, selectively removing from the article substantially all said liquid adhering to said outside surface, connecting said electrodes to the power source, and utilizing any of said liquid which passes through a hole in the article to connect the electrodes and close said circuit.

8. The method for testing a rubber prophylactic article for holes which comprises the steps of slightly stretching the article, inserting into the article a pair of closely spaced, independent electrodes constituting part of an open electric circuit including an electric power source, contacting the outside surface of the thus expanded article with an electrically conductive liquid, heating and evaporating said liquid adhering to said outside surface without removing substantially any such liquid which passes through a hole in the article, connecting said electrodes to the power source, and utilizing any of said liquid in the article to connect the electrodes and close said circuit.

9. The method for testing a rubber prophylactic article for holes which comprises the steps of slightly stretching the article, inserting into the article a pair of closely spaced, independent electrodes constituting part of an open electric circuit including an electric power source, removing said article from said bath, subjecting the outer surface of the article to a temperature between about 110° F. and about 130° F. for about three minutes and thereby selectively removing substantially all the water adhering to said surface, connecting said electrodes to the power source, and utilizing any of said water which passes through a hole in the article to connect the electrodes and close said circuit.

10. Apparatus for detecting perforations in a wall of an elastic dielectric article comprising a form for carrying the article, means for contacting the article on the form with electrically conductive liquid, and electrical means for sensing contact of the liquid with predetermined portions of the form to signal the presence of a defective article on said form, said electrical means comprising an electric power source, electrode means connected to said source, and means connected to the said source for converting electrical energy to actuate a signal when liquid contacts said predetermined portions of the form and thereby closes the circuit through the electrode means, said electrode means consisting of an electrode forming a portion of the form, and a second electrode to be received in said article and spaced apart from the first electrode and electrically connectible to the first said electrode by liquid contacting the form.

11. Apparatus for detecting perforations in a wall of an elastic dielectric article comprising a form for carrying the article, means for contacting the article on the form with electrically conductive liquid, and electrical means for sensing contact of the liquid with predetermined portions of the form to signal the presence of a defective article on said form, said electrical means comprising an electrical power source, electrode means connected to said source, and means connected to the said source for converting electrical energy to actuate a signal when liquid contacts said predetermined portions of the form and thereby closes the circuit through the electrode means, said electrode means consisting of an electrode, and a second electrode spaced apart from the first electrode and electrically connectible to the first said electrode by liquid contacting the form, said first and second electrodes having exposed surface portions substantially flush with adjacent surface portions of the form.

12. Apparatus for detecting perforations in a wall of an elastic dielectric article comprising a form for carrying the article and having a surface to bear firmly against substantially the entire surface area of one side of said wall, means for contacting the opposite side of the said wall with electrically conductive liquid, and electrical means for sensing contact of the liquid with predetermined portions of the form to signal the presence of a defective article on said form, said electrical means comprising an electrical power source, electrode means connected to said source, and means connected to the said source for converting electrical energy to actuate a signal when liquid contacts said predetermined portions of the form and thereby closes the circuit through the electrode means, said electrode means consisting of an electrode, and a second electrode spaced apart from the first electrode and electrically connectible to the first said electrode by liquid contacting the form, said first and second electrodes having exposed surface portions substantially flush with adjacent surface portions of the form.

13. Apparatus for detecting perforations in a wall of an elastic dielectric article comprising a form for carrying the article, means including a vessel containing an electrically conductive liquid for contacting the article on the form with said liquid, and electrical means for sensing contact of the liquid with predetermined portions of the form to signal the presence of a defective article on said form, said electrical means comprising an electrical power source, electrode means connected to said source, and means connected to the said source for converting electrical energy to actuate a signal when liquid contacts said predetermined portions of the form and thereby closes the circuit through the electrode means, said electrode means consisting of an electrode, and a second electrode spaced apart from the first electrode and electrically connectible to the first said electrode by liquid contacting the form, said first and second electrodes having exposed surface portions substantially flush with adjacent surface portions of the form.

14. Apparatus for detecting perforations in a thin rubber sheath comprising a finger-shaped form for carrying the sheath, means for contacting the article on the form with electrically conductive liquid, and electrical means for sensing contact of the liquid with predetermined portions of the form to signal the presence of a defective article on said form, said electrical means comprising an electrical power source, electrode means connected to said source, and means connected to the said source for converting electrical energy to actuate a signal when liquid contacts said predetermined portions of the form and thereby closes the circuit through the electrode means, said electrode means consisting of an electrode, and a second electrode spaced apart from the first electrode and electrically connectible to the first said electrode by liquid contacting the form, said first and second electrodes having exposed surface portions substantially flush with adjacent surface portions of the form.

15. Apparatus for detecting perforations in a thin rubber sheath comprising a finger-shaped form for carrying the sheath, means including a vessel containing an electrically conductive liquid for contacting the sheath encasing the form with said liquid, and electrical means for sensing contact of the liquid with predetermined portions of the form to signal the presence of a defective article on said form, said electrical means comprising an electrical power source, electrode means connected to said source, and means including a solenoid connected to the said source for converting electrical energy to actuate a signal when liquid contacts said predetermined portions of the form and thereby closes the circuit through the electrode means, said electrode means consisting of an electrode, and a second electrode to be received in said article and spaced apart from the first electrode and electrically connectible to the first said electrode by liquid contacting the form, said first and second electrodes having exposed surface portions substantially flush with adjacent surface portions of the form.

16. Apparatus for detecting perforations in elastic articles and separating perforate from imperforate articles comprising travelling forms for carrying such articles, means for contacting articles on the forms with electrically conductive liquid, electrical means for sensing contact of the liquid with predetermined portions of each form to signal the presence of a defective article on each form, said electrical means comprising an electrical power source, electrode means for each form connected to said source, and means connected to the said source for converting electrical energy to actuate a signal when liquid contacts said predetermined portions of any form and thereby closes the circuit through the electrode means, said electrode means of each form consisting of an electrode forming a portion of a form, and a second electrode to be received in said article and spaced apart from the first electrode and electrically connectible to the first said electrode by liquid contacting the form, and means connected to the power source for changing the position of the form when the liquid contacts the electrodes and closes the circuit through said electrodes.

EDWARD S. KILLIAN.

REFERENCES CITED

The following references are of record in the file of this patent:

UNITED STATES PATENTS

| Number | Name | Date |
|---|---|---|
| 1,910,021 | Legg | May 23, 1933 |
| 2,244,591 | Youngs | June 3, 1941 |
| 2,285,421 | Dunmore | June 9, 1942 |
| 2,297,837 | Loughnane | Oct. 6, 1942 |
| 2,328,853 | Sherrard | Sept. 7, 1943 |
| 2,343,520 | Baver et al. | Mar. 7, 1944 |
| 2,381,299 | McCulloch | Aug. 7, 1945 |
| 2,503,803 | Cremer et al. | Apr. 11, 1950 |